US012361762B2

(12) United States Patent
Yin et al.

(10) Patent No.: US 12,361,762 B2
(45) Date of Patent: Jul. 15, 2025

(54) IMAGE PROCESSING METHOD AND APPARATUS, DEVICE, STORAGE MEDIUM, AND COMPUTER PROGRAM PRODUCT

(71) Applicant: TENCENT TECHNOLOGY (SHENZHEN) COMPANY LIMITED, Guangdong (CN)

(72) Inventors: Bangjie Yin, Shenzhen (CN); Taiping Yao, Shenzhen (CN); Shuang Wu, Shenzhen (CN); Jia Meng, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 476 days.

(21) Appl. No.: 17/989,254

(22) Filed: Nov. 17, 2022

(65) Prior Publication Data
US 2023/0086552 A1    Mar. 23, 2023

Related U.S. Application Data

(63) Continuation of application No. PCT/CN2022/079872, filed on Mar. 9, 2022.

(30) Foreign Application Priority Data

Apr. 2, 2021   (CN) .......................... 202110359536.2

(51) Int. Cl.
G06V 40/40    (2022.01)
G06V 10/77    (2022.01)
(Continued)

(52) U.S. Cl.
CPC .......... *G06V 40/45* (2022.01); *G06V 10/7715* (2022.01); *G06V 10/774* (2022.01);
(Continued)

(58) Field of Classification Search
CPC ......... G06V 40/40–50; G06V 10/7715; G06V 30/2504; G06V 10/80–809
See application file for complete search history.

(56) References Cited

U.S. PATENT DOCUMENTS

2015/0023558 A1    1/2015  Gokmen
2016/0379072 A1*  12/2016  Fan ........................... G06T 7/00
                                                                      382/118
(Continued)

FOREIGN PATENT DOCUMENTS

CN    110163078 A    8/2019
CN    110569760 A    12/2019
(Continued)

OTHER PUBLICATIONS

Toosi, Amirhosein, et al. "Feature fusion for fingerprint liveness detection: a comparative study." IEEE Access 5 (2017): 23695-23709. (Year: 2017).*
(Continued)

*Primary Examiner* — Raphael Schwartz
(74) *Attorney, Agent, or Firm* — Sughrue Mion, PLLC

(57) ABSTRACT

An image processing method, including: obtaining an original image, the original image including biological features of a to-be-detected object, fusing a global frequency domain map corresponding to the original image with the original image to obtain a global fusion image, performing living body detection on the global fusion image to obtain a first detection result, determining that the original image does not pass the living body detection when the first detection result indicates that the original image belongs to a screen reproduced image, obtaining, when the original image does not belong to the screen reproduced image, a biological feature image based on the biological features, fusing a local frequency domain map with the biological feature image to obtain a local fusion image, performing living body detec-
(Continued)

tion on the local fusion image to obtain a second detection result, and determining a living body detection result corresponding to the original image.

20 Claims, 7 Drawing Sheets

(51) Int. Cl.
*G06V 10/774* (2022.01)
*G06V 10/80* (2022.01)
*G06V 10/82* (2022.01)
*G06V 10/94* (2022.01)

(52) U.S. Cl.
CPC ............ *G06V 10/803* (2022.01); *G06V 10/82* (2022.01); *G06V 10/95* (2022.01)

(56) References Cited

U.S. PATENT DOCUMENTS

| | | | | |
|---|---|---|---|---|
| 2019/0209052 | A1* | 7/2019 | Jeanne | ................ A61B 5/7246 |
| 2024/0071142 | A1* | 2/2024 | Abraham | ............. G06V 10/462 |

FOREIGN PATENT DOCUMENTS

| | | |
|---|---|---|
| CN | 111126493 A | 5/2020 |
| CN | 112464690 A | 3/2021 |
| CN | 112507934 A | 3/2021 |
| CN | 112801057 A | 5/2021 |

OTHER PUBLICATIONS

International Search Report for PCT/CN2022/079872 dated May 25, 2022 [PCT/ISA/210].
Written Opinion for PCT/CN2022/079872 dated May 25, 2022 [PCT/ISA/237].
Chinese Office Action for CN 2021103595362 dated Apr. 2, 2021.

* cited by examiner

IMAGE PROCESSING METHOD AND APPARATUS, DEVICE, STORAGE MEDIUM, AND COMPUTER PROGRAM PRODUCT

CROSS-REFERENCE TO RELATED APPLICATIONS

This application is a continuation application of International Application No. PCT/CN2022/079872, filed on Mar. 9, 2022, which claims priority to Chinese Patent Application No. 202110359536.2, filed with the China National Intellectual Property Administration on Apr. 2, 2021, the disclose of each of which being incorporated by reference herein in their entireties.

FIELD

The disclosure relates to the field of artificial intelligence technology, and in particular, to an image processing method and apparatus, a computer device, a non-transitory storage medium, and a computer program product.

BACKGROUND

With the development of computer technology and artificial intelligence technology, to more accurately and conveniently identify an identity of a user, living body detection technology has emerged. The living body detection technology may verify whether the user is a real living body by using biological feature information, and may effectively resist common methods, or attacks, for faking or obscuring, etc. one's identity such as a photo retouch or modification, a face swap, a mask, and an occlusion, etc. Living body detection includes face living body detection, palm print living body detection, iris living body detection, or the like.

Currently, because there may be many different attack types in real life, texture features of some attack images are not so obvious and it is difficult to distinguish even with the naked eye according to a texture of the attack image, a manner of performing living body detection by only relying on single image texture information has relatively poor generalization on different types of attack images, and the detection accuracy is relatively low.

SUMMARY

According to an aspect of one or more embodiments, an image processing method may include obtaining an original image, the original image including biological features of a to-be-detected object; fusing a global frequency domain map corresponding to the original image with the original image to obtain a global fusion image; performing living body detection on the global fusion image to obtain a first detection result corresponding to the original image; directly determining that the original image does not pass the living body detection when the first detection result indicates that the original image belongs to a screen reproduced image; and when the first detection result indicates that the original image does not belong to the screen reproduced image, obtaining a biological feature image based on the biological features in the original image, fusing a local frequency domain map corresponding to the biological feature image with the biological feature image to obtain a local fusion image, performing living body detection on the local fusion image to obtain a second detection result corresponding to the original image, and determining a living body detection result corresponding to the original image according to the first detection result and the second detection result.

According to another aspect of one or more embodiments, a method for processing a living body detection model may include obtaining a first sample image in a first sample set, fusing a global frequency domain map corresponding to the first sample image with the first sample image to obtain a global fusion image, performing living body detection on the global fusion image through a first model based on a neural network to obtain a first detection result corresponding to the first sample image, determining a first loss based on the first detection result and a labeling category of the first sample image, and after adjusting model parameters of the first model according to the first loss, returning to the operation of obtaining a first sample image in a first sample set to continue training until a global detection network is obtained when the training ends; obtaining a second sample image in a second sample set, obtaining a sample biological feature image according to biological features of the second sample image, fusing a local frequency domain map corresponding to the sample biological feature image with the sample biological feature image to obtain a local fusion image, performing living body detection on the local fusion image through a second model based on the neural network to obtain a second detection result corresponding to a second sample image, determining a second loss based on the second detection result and a labeling category of the second sample image, and after adjusting model parameters of the second model according to the second loss, returning to the operation of obtaining a second sample image in a second sample set to continue training until a local detection network is obtained when the training ends; and obtaining a living body detection model used for performing living body detection on an image according to the global detection network and the local detection network.

An image processing apparatus, an apparatus for processing a living body detection model, a computer device, a-transitory computer-readable storage medium, a computer program consistent with the foregoing methods may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
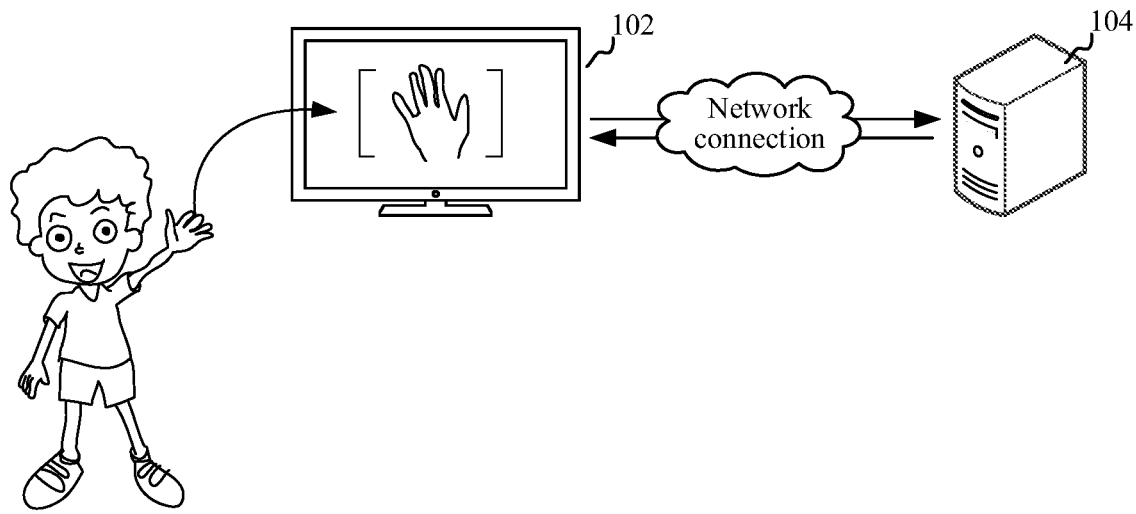
FIG. 1 is a diagram of an application environment of an image processing method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

An image processing method and a method for processing a living body detection model provided in some embodiments implement living body detection by using the computer vision technology and machine learning technology in artificial intelligence technology (AI).

The to-be-detected image mentioned in various embodiments is an original image on which living body detection process is to be performed. Living body detection is a process of determining real biological features of the to-be-detected object. The to-be-detected image includes the biological features of a to-be-detected object. The biological feature may uniquely confirm the to-be-detected object, including physiological features or behavioral features. The physiological features include a palm print, a fingerprint, a face, an iris, a hand shape, a retina, an auricle, or the like, and the behavioral features include gait, handwriting, or the like.

In some embodiments, the biological features of the to-be-detected object may be any one or more of the foregoing biological features. In some embodiments, a computer device obtains a to-be-detected image, the to-be-detected image including biological features of a to-be-detected object; performs living body detection on a global frequency domain map corresponding to the to-be-detected image and a global fusion image obtained by fusing the to-be-detected image to obtain a first detection result corresponding to the to-be-detected image; directly determines that the to-be-detected image does not pass the living body detection in a case that the first detection result indicates that the to-be-detected image belongs to a screen reproduced image; and in a case that the first detection result indicates that the to-be-detected image does not belong to the screen reproduced image, obtains a biological feature image based on the biological features in the to-be-detected image, performs living body detection on the local fusion image obtained by fusing a local frequency domain map corresponding to the biological feature image with the biological feature image to obtain a second detection result corresponding to the to-be-detected image, and determines a living body detection result corresponding to the to-be-detected image according to the first detection result and the second detection result.

The method provided in some embodiments is described below mainly by using the biological feature as a palm print.

An image processing method provided in some embodiments may be applied to an application environment shown in FIG. 1. A terminal 102 communicates with a living body detection server 104 through a network. The terminal 102 may obtain a to-be-detected image, the to-be-detected image including the palm print of a to-be-detected object; perform living body detection on a global frequency domain map corresponding to the to-be-detected image and a global fusion image obtained by fusing the to-be-detected image to obtain a first detection result of the palm print in the to-be-detected image; directly determine that the to-be-detected image does not pass the living body detection in a case that the first detection result indicates that the to-be-detected image belongs to a screen reproduced image; obtain a palm print image based on a palm print region in the to-be-detected image in a case that the first detection result indicates that the to-be-detected image does not belong to a screen reproduced image; perform living body detection on a local fusion image obtained by fusing a local frequency domain map corresponding to the palm print image with the palm print image to obtain a second detection result of the palm print in the to-be-detected image; and determine a living body detection result of the palm print of the to-be-detected object according to the first detection result and the second detection result.

In some embodiments, the terminal 102 may obtain the to-be-detected image; transmit the to-be-detected image to the living body detection server 104, and perform living body detection on a global frequency domain map corresponding to the to-be-detected image and a global fusion image obtained by fusing the to-be-detected image through the living body detection server 104 to obtain a first detection result of the palm print in the to-be-detected image; directly determine that the to-be-detected image does not pass the living body detection in a case that the first detection result indicates that the to-be-detected image belongs to a screen reproduced image; obtain a palm print image based on a palm print region in the to-be-detected image in a case that the first detection result indicates that the to-be-detected image does not belong to a screen reproduced image; perform living body detection on a local fusion image obtained by fusing a local frequency domain map corresponding to the palm print image with the palm print image to obtain a second detection result of the palm print in the to-be-detected image; and determine a living body detection result of the palm print of the to-be-detected object and return a palm print living body detection result to the terminal 102 according to the first detection result and the second detection result.

The terminal 102 may be, but not limited to, a personal computer, a notebook computer, a smartphone, a tablet computer, a portable wearable device, and an in-vehicle terminal. The living body detection server 104 may be implemented by an independent server or a server cluster including a plurality of servers.

In some embodiments, the living body detection model based on the artificial neural network may be obtained by training a computer device, the computer device may obtain a first sample image in a first sample set, living body detection is performed on a global fusion image obtained by fusing the global frequency domain map corresponding to the first sample image with the first sample image through a first model based on a neural network to obtain a first detection result of the palm print in the first sample image, and after adjusting model parameters of the first model according to a first loss determined based on the first detection result and a labeling category of the first sample image, the operation of obtaining the first sample image in the first sample set is returned to continue training until a global detection network is obtained when the training ends; a second sample image in a second sample set is obtained, a sample palm print image is obtained according to a palm print region of the second sample image, living body detection is performed on a local fusion image obtained by fusing a local frequency domain map corresponding to the sample palm print image with the sample palm print image through a second model based on the neural network to obtain a second detection result of the palm print in the second sample image, and after adjusting model parameters of the second model according to a second loss determined based on the second detection result and a labeling category of the second sample image, a operation of obtaining the second sample image in the second sample set is returned to continue training until a local detection network is obtained in a case that the training ends; and a living body detection model used for performing palm print living body detection on an image is obtained according to the global detection network and the local detection network. The computer device used for training a living body detection model may be a terminal or a server.

In some embodiments, when a palm print verification device needs to authenticate an identity of the user, the palm print verification device may acquire a palm print image of the user, living body detection is performed on the global fusion image obtained by fusing the global frequency domain map corresponding to the to-be-detected image and the to-be-detected image through the global detection network in the trained living body detection model to obtain the first detection result of the palm print in the to-be-detected image, and the palm print image is obtained based on the palm print region in the to-be-detected image through the local detection network in the trained living body detection model; living body detection is performed on a local fusion image obtained by fusing a local frequency domain map corresponding to the palm print image with the palm print image to obtain a second detection result of the palm print in the to-be-detected image, and finally, the living body detection result of the palm print of the to-be-detected object is determined according to the first detection result and the second detection result; palm print recognition is performed on the palm print in the to-be-detected image to obtain a palm print recognition result in a case that the living body detection result indicates that the palm print in the to-be-detected image is a living body palm print; and identity authentication is performed on the to-be-detected object according to the palm print recognition result. The palm print verification device may be a mobile phone, a palm print verification machine, or another device with an image acquisition device.

Figure 2:
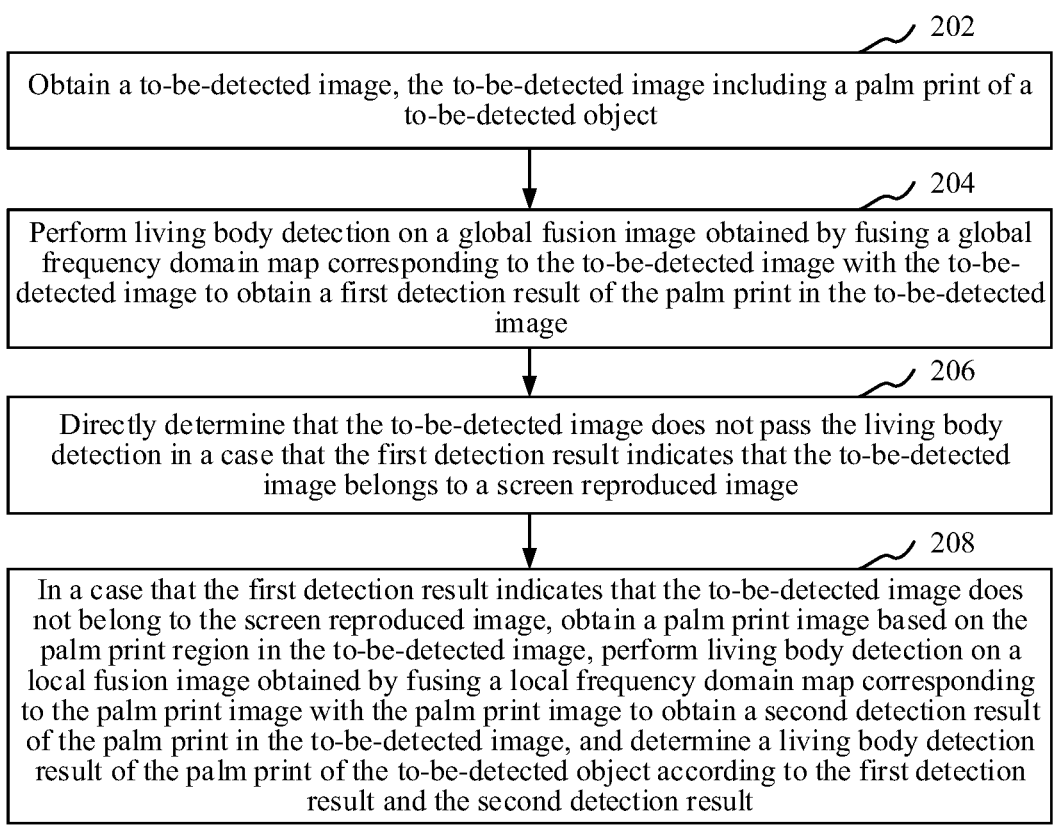
FIG. 2 is a schematic flowchart of an image processing method according to some embodiments.

In some embodiments, as shown in FIG. 2, an image processing method is provided, and a description is made by using an example in which the method is applied to a computer device (a terminal 102 or a server 104) in FIG. 1, including the following operations:

Operation 202. Obtain a to-be-detected image, the to-be-detected image including the palm print of a to-be-detected object.

The to-be-detected image is an image on which palm print living body detection is to be performed, and the to-be-detected image includes the palm print of the to-be-detected object. The palm print in the to-be-detected image may be a part of the palm print of the to-be-detected object, or may also be all of the palm print of the to-be-detected object. Palm print living body detection is a method for identifying whether the image is an image acquired from a real living body of the to-be-detected object according to the palm print in the image, and is usually used for determining whether the to-be-detected object includes a real living body, and is often applied in scenarios of identity authentication, which may effectively resist the attack of a reproduced image.

The computer device may instantly acquire an image through a local image acquisition device, and use the acquired image as the to-be-detected image. For example, a palm image of the user acquired by the terminal 102 in FIG. 1 through a camera is used as the to-be-detected image. The to-be-detected image may also be an image locally exported from a computer device, and the image is used as the to-be-detected image. The locally exported image may be a pre-taken photo including the palm print or a stored photo including the palm print, but it is to be understood that the locally exported image usually does not pass the palm print living body detection. In some embodiments, the to-be-detected image acquired by the computer device may be an image focusing on external features of the palm. The external features of the palm are a palm line, a fold, or the like. The to-be-detected image may also be an image focusing on a palm structure and internal features. The palm structure and internal features are a vein, a bone, a soft tissue, or the like.

In some embodiments, the to-be-detected image of the living body palm print may be obtained by non-contact acquisition. For example, the user stretches out the palm in the air, and the computer device scans and acquires the palm image through the camera to obtain the to-be-detected image. In some other embodiments, the to-be-detected image may be obtained by contact acquisition. For example, the palm print verification device is provided with a palm print acquisition touch screen, the user may place the palm on the palm print acquisition touch screen, and the palm print verification device may acquire an image of the palm as the to-be-detected image.

Operation 204. Perform living body detection on a global fusion image obtained by fusing a global frequency domain map corresponding to the to-be-detected image with the to-be-detected image to obtain a first detection result of the palm print in the to-be-detected image.

The to-be-detected image is an image that reflects texture distribution features of the image in a spatial domain (also referred to as a time domain), and is data representing grayscale distribution features of the to-be-detected image in the spatial domain. The to-be-detected image includes grayscale information of three channels, and each channel may be represented by grayscale or intensity of the to-be-detected image at each pixel. The to-be-detected image is an RGB image, and the RGB image is a three-channel color pixel image. The three-channel color pixel image respectively corresponds to a red component, a green component, and a blue component of each pixel in the RGB image.

Frequency domain transformation is a process of converting the to-be-detected image from grayscale distribution to frequency domain distribution, and the obtained global frequency domain map represents features of the entire to-be-detected image in the frequency domain. The frequency domain transformation may be fast Fourier transform, wavelet transform, Laplace transform, or the like.

The global frequency domain map is a feature image that reflects the overall frequency domain distribution features of the to-be-detected image. By converting the to-be-detected image from grayscale distribution to frequency domain distribution, the features of the to-be-detected image may be observed from the overall frequency domain distribution. The global represents image information of the entire to-be-detected image for distinguishing, and the palm print region in the to-be-detected image mentioned below is local image information in the to-be-detected image. The global frequency domain map is a frequency domain map obtained by performing frequency domain transformation on the entire to-be-detected image. A high-frequency component in the global frequency domain map represents a part in which a grayscale value of the to-be-detected image changes abruptly, and corresponds to detailed information in the to-be-detected image. A low-frequency component represents a part with a relatively average grayscale value in the to-be-detected image, and corresponds to contour information in the to-be-detected image. The global fusion image is a multi-channel image obtained by fusing the to-be-detected image with the global frequency domain map. The global fusion image carries the image features of the to-be-detected image in the spatial domain and the frequency domain.

Because texture features of a high-definition reproduced image are not so obvious, such as a high-definition screen reproduced palm print image and a high-definition paper reproduced palm print image, if classification is performed by only relying on a subtle texture and a material of the image, it is difficult to distinguish even with the naked eye, the manner may only perform detection on some images with obvious texture features, and the detection effect is limited. For some high-definition reproduced palm print images with some inconspicuous texture features, it is difficult to obtain a relatively good effect by performing processing on these images in the spatial domain, but a good effect may be achieved by performing detection on these images in the frequency domain. In addition, there are some depth images whose palm prints may be directly or indirectly obtained through the hardware device, and then it is determined whether the current palm print image is a living body palm print or palm prints in some reproduced images through a depth image. However, a disadvantage of the manner is that the use of 3D depth information is highly dependent on the hardware device, the cost is relatively higher than that of a conventional camera, and the use of a structured light sensor is easily affected by a surrounding light environment.

In some embodiments, by fusing the texture information of the to-be-detected image and the frequency domain information of the to-be-detected image, living body detection is then performed after the global fusion image is obtained. With reference to the two different image information, the detection is caused to be more accurate, a plurality of different scenarios may be adapted, and the acquisition of the to-be-detected image does not require a specific hardware device, and only one to-be-detected image is required to implement the good detection effect.

In addition, reproduced images of different attack types have different features. For example, the texture features of the high-definition screen reproduced palm print image, such as moiré, exist in the foreground and background. Therefore, when processing is performed on the whole image, the global information of the image may be focused. However, the high-definition paper reproduced palm print image is quite different from the living body palm print image in the palm print region. Therefore, it is necessary to pay more attention to local information of a cropped palm print region of the to-be-detected image, so that a more accurate texture difference with the living body palm print is obtained, which is introduced below.

In some embodiments, the computer device performs frequency domain transformation processing on the to-be-detected image to obtain the global frequency domain map; and fuses a global frequency domain map with the to-be-detected image to obtain a global fusion image.

The frequency domain transformation may be fast Fourier transform, wavelet transform, Laplace transform, or the like. For example, the computer device may perform fast Fourier transform on the to-be-detected image to obtain a global frequency domain map, and then fuse the three-channel to-be-detected image with the global frequency domain map by channel to obtain a four-channel image as a global fusion image.

In some embodiments, the computer device obtains an original acquired image, adjusts the acquired image to the first preset size to obtain the to-be-detected image, and then performs frequency domain transformation processing on the to-be-detected image to obtain the global frequency domain map.

In a specific embodiment, the computer device scales the original acquired image to a preset size, for example, the preset size may be 224*224*3, to obtain the to-be-detected image, then performs fast Fourier transform processing on the to-be-detected image to obtain the global frequency domain map, and then fuses the to-be-detected image with the global frequency domain map corresponding to the to-be-detected image to form a four-channel image as a global fusion image.

In some embodiments, the computer device may perform living body detection on the global fusion image by using the trained global detection network based on the neural network to obtain the first detection result of the palm print in the to-be-detected image. The first detection result is one of whether the to-be-detected image passes the palm print living body detection or does not pass the palm print living body detection, that is, whether the palm print of the to-be-detected object in the to-be-detected image is a living body palm print.

Because the global fusion image carries all the texture information of the to-be-detected image and the global features of the to-be-detected image in the frequency domain, with reference to the two different image information, the detection is caused to be more accurate and a plurality of different scenarios may be adapted, and especially the high-definition screen reproduced image may have the good detection effect.

Operation 206. Directly determine that the to-be-detected image does not pass the living body detection in a case that the first detection result indicates that the to-be-detected image belongs to a screen reproduced image.

Operation 208. In a case that the first detection result indicates that the to-be-detected image does not belong to the screen reproduced image, obtain a palm print image based on the palm print region in the to-be-detected image, perform living body detection on a local fusion image obtained by fusing a local frequency domain map corresponding to the palm print image with the palm print image to obtain a second detection result of the palm print in the to-be-detected image, and determine a living body detection result of the palm print of the to-be-detected object according to the first detection result and the second detection result.

Attack types of living body detection may be generally divided into two categories. One is the high-definition screen reproduced image mentioned above, which may be determined based on global information of the to-be-detected image, and the other is the high-definition paper reproduced image. The palm print region of the paper reproduced palm print image has a relatively large texture difference with the living body palm print. Based on this, to be able to deal with different attack types, the computer device sets two-level detection. When the first detection result indicates that the to-be-detected image does not belong to the screen reproduced palm print image, processing is further performed on the palm print region in the to-be-detected image, so as to be more related to local information in the to-be-detected image, that is, image information of a region in which the palm print is located.

The palm print region is a region in which the palm print is located. The region in which the palm print is located may be a region in which the entire palm is located, or a region in which the center of the palm is located. The palm print image obtained according to the palm print region may be obtained by performing scaling processing on a rectangular region surrounding the palm print in the to-be-detected image. After obtaining the to-be-detected image, the computer device may extract the palm print region in the to-be-detected image, and crop the to-be-detected image according to the palm print region to obtain the palm print image.

In some embodiments, the computer device may perform cropping processing on the to-be-detected image by using a palm print extraction tool to obtain a palm print region, and then scale the palm print region to a preset size to obtain a palm print image.

In some embodiments, the computer device may perform palm print detection on the to-be-detected image to determine a palm print region in the to-be-detected image; and crop the to-be-detected image according to the palm print region to obtain the palm print image.

In some embodiments, the computer device may obtain the original acquired image, and perform palm print detection on the acquired image to determine the palm print region in the acquired image; and after cropping the palm print region from the acquired image, adjust the palm print region to a second preset size to obtain the palm print image.

The palm print image is an image that reflects texture distribution features of the palm print in a spatial domain (also referred to as a time domain), and is data representing grayscale distribution features of the palm print image in the spatial domain. The palm print image includes grayscale information of three channels, and each channel may be represented by grayscale or intensity of the palm print image at each pixel. The palm print image is an RGB image, and the RGB image is a three-channel color pixel image. The three-channel color pixel image respectively corresponds to a red component, a green component, and a blue component of each pixel in the RGB image.

Frequency domain transformation is a process of converting the palm print image from grayscale distribution to frequency domain distribution, and the obtained global frequency domain map represents features of the entire palm print image in the frequency domain. The frequency domain transformation may be fast Fourier transform, wavelet transform, Laplace transform, or the like.

The palm print region is the local image information in the to-be-detected image. Therefore, the local frequency domain map is a feature image that reflects the frequency domain distribution features of the palm print region in to-be-detected image. The palm print image obtained based on the palm print region in the to-be-detected image is converted from the grayscale distribution to the frequency domain distribution, and the features of the palm print image may be observed from the overall frequency domain distribution. The local frequency domain map is a frequency domain map obtained by performing frequency domain transformation on the palm print image. A high-frequency component in the local frequency domain map represents a part of the palm print image in which a grayscale value changes abruptly, and corresponds to detailed information in the palm print image. A low-frequency component represents a part with a relatively average grayscale value in the palm print image, and corresponds to contour information in the palm print image. The local fusion image is a multi-channel image obtained by fusing the palm print image with the local frequency domain map. The local fusion image carries the image features of the palm print image in the spatial domain and the frequency domain.

Similarly, for some high-definition reproduced palm print images with some inconspicuous texture features, it is difficult to obtain a relatively good effect by processing these images in the spatial domain, but a good effect may be achieved by performing detection on these images in the frequency domain. To this end, the computer device fuses the texture information of the palm print image and the frequency domain information of the palm print image to obtain a local fusion image and then performs the palm print living body detection. With reference to the two different image information, the detection is caused to be more accurate and a plurality of different scenarios may be adapted.

In some embodiments, the computer device performs frequency domain transformation processing on the palm print image to obtain the local frequency domain map; and fuses the palm print image frequency domain map with a local frequency domain map to obtain a local fusion image.

The frequency domain transformation may be fast Fourier transform, wavelet transform, Laplace transform, or the like. For example, the computer device may perform fast Fourier transform on the palm print image to obtain a local frequency domain map, and then fuse the three-channel palm print image with the local frequency domain map by channel to obtain a four-channel image as a local fusion image.

In some embodiments, the computer device obtains the original acquired image, and after cropping the palm print region from the acquired image, adjusts the palm print region to a second preset size, for example, the second preset size may be 122*122*4, to obtain the palm print image, and then fuses the palm print image with the local frequency domain map corresponding to the palm print image to form a four-channel image as a local fusion image.

In some embodiments, the computer device may perform living body detection on the local fusion image by using the trained local detection network based on the neural network to obtain the second detection result of the palm print in the to-be-detected image. The second detection result is one of whether the palm print image passes the palm print living body detection or does not pass the palm print living body detection, that is, whether the palm print of the to-be-detected object in the to-be-detected image is a living body palm print.

Because the local fusion image carries the texture information of the palm print in the to-be-detected image and the features of the palm print in the to-be-detected image in the frequency domain, with reference to the two different image information, the detection is caused to be more accurate, and a plurality of different scenarios may be adapted, especially the high-definition paper reproduced image may have the good detection effect.

Operation 204 and operation 208 are two independent operations, and their execution order may be reversed or executed in parallel.

It is to be learnt from the previous introduction, the first detection result obtained by the computer device is a detection result obtained by performing living body detection by using the global information of the to-be-detected image. The second detection result is a detection result obtained by performing living body detection by using the global information detection by paying more attention to the local information in the to-be-detected image. It is more accurate to jointly determine the living body detection result of the palm print in the to-be-detected image with reference to the two detection results. Both the first detection result and the second detection result represent the probability that the palm print in the to-be-detected image belongs to the palm print in the reproduced image. Both the first detection result and the second detection result may represent the probability that the palm print in the to-be-detected image belongs to a living body palm print.

In some embodiments, the determining the living body detection result of the palm print of the to-be-detected object according to the first detection result and the second detection result includes: obtaining, in a case that the first detection result indicates a first probability that the palm print of the to-be-detected object belongs to the palm print in the screen reproduced palm print image, and the first probability is less than a first threshold, the second detection result, where the second detection result indicates a second probability that the palm print of the to-be-detected object belongs to the palm print in a paper reproduced palm print image; and determining that the palm print of the to-be-detected object is the living body palm print in a case that the second probability is less than a second threshold.

Because the texture of the screen reproduced palm print image is not obvious enough, when the first detection result indicates the first probability that the palm print in the to-be-detected image belongs to the palm print in the screen reproduced palm print image is less than the first threshold, it indicates that the to-be-detected image does not belong to the screen reproduced image, but may be a living body palm print image. Further, according to the second detection result obtained by performing living body detection by paying more attention to local information, when the second detection result indicates the second probability that the palm print in the to-be-detected image belongs to the palm print in the paper reproduced palm print image is less than the second threshold, it may be more certain that the palm print in the to-be-detected image is a living palm print, and the to-be-detected image passes the living body detection. The first threshold and the second threshold may be the same value, or may be different values. For example, both the first threshold and the second threshold may be 0.4.

In some embodiments, the method further includes: determining that the palm print of the to-be-detected object is the palm print in the screen reproduced palm print image in a case that the first probability is greater than the first threshold; and determining that the palm print of the to-be-detected object is the palm print in the paper reproduced palm print image in a case that the second probability is greater than the second threshold.

In this embodiment, when the first probability is greater than the first threshold, it may be directly determined that the palm print in the to-be-detected image is the palm print in the screen reproduced palm print image, and the to-be-detected image does not pass the living body detection. When the first probability is less than the first threshold, further, according to the second detection result obtained by performing the living body detection by paying more attention to local information, when the second detection result indicates the second probability that the palm print in the to-be-detected image belongs to the palm print in the paper reproduced palm print image is greater than the second threshold, it is determined that the palm print of the to-be-detected object is the palm print in the paper reproduced palm print image, and the to-be-detected image does not pass the living body detection.

In some embodiments, the determining the living body detection result of the palm print of the to-be-detected object according to the first detection result and the second detection result includes: when the first detection result indicates the first probability that the palm print of the to-be-detected object belongs to the living body palm print, and the second detection result indicates the second probability that the palm print of the to-be-detected object belongs to the living body palm print, if the first probability is less than the first threshold, directly determining that the to-be-detected image is a reproduced palm print image, if the first probability is greater than the first threshold, further checking whether the second probability is greater than the second threshold, if the second probability is less than the second threshold, directly determining that the to-be-detected image is a reproduced palm print image, and if the second probability is also greater than the second threshold, finally determining that the to-be-detected image is a living body palm print image.

Figure 3:
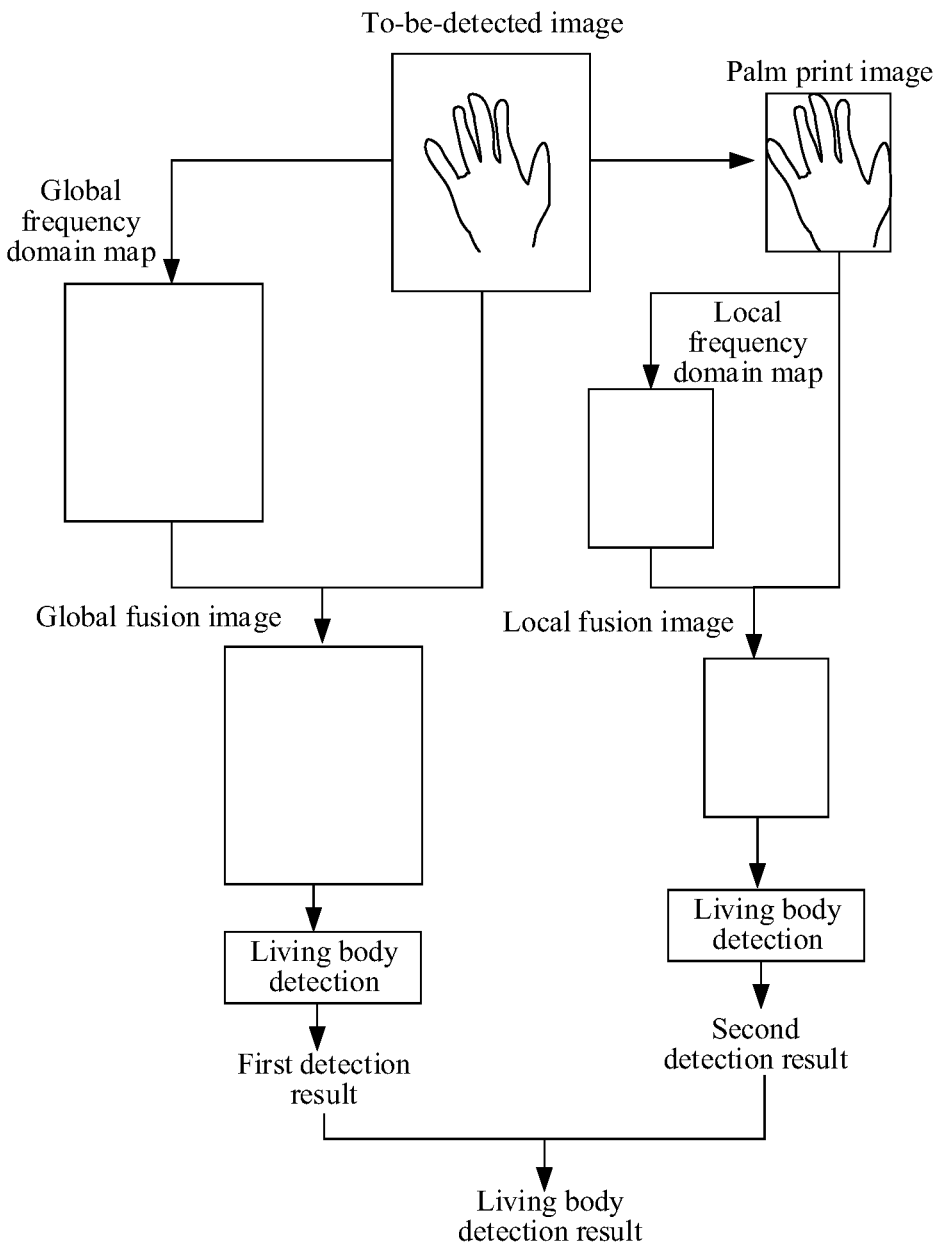
FIG. 3 is a schematic flowchart of an image processing method according to some embodiments.

FIG. 3 is a schematic flowchart of an image processing method according to some embodiments. Referring to FIG. 3, after obtaining the to-be-detected image, the computer device obtains a palm print image by using the to-be-detected image, performs living body detection on the to-be-detected image and the palm print image in parallel to respectively obtain the corresponding frequency domain map, then performs living body detection after fusing an input image of each channel with the corresponding frequency domain map to obtain the corresponding detection result, and then determines the final palm print living body detection result of the to-be-detected image by using the respective detection result.

In some embodiments, the method further includes: performing palm print recognition on the palm print in the to-be-detected image to obtain a palm print recognition result in a case that the living body detection result indicates that the palm print in the to-be-detected image is a living body palm print; and performing identity authentication on the to-be-detected object according to the palm print recognition result.

The to-be-detected image may be an image on which the palm print recognition is to be performed. The operation of the palm print living body detection provided in some embodiments may be directly deployed before the operation of palm print recognition. After passing the palm print living body detection, the to-be-detected image then enters a subsequent palm print recognition process, and when the palm print recognition is passed, it is determined that the to-be-detected image passes the identity authentication; and when the to-be-detected image does not pass the palm print living body detection, an error may be reported and a retry may be prompted. The palm print living body detection may be applied to scenarios such as online palm print payment, offline palm print payment, a palm print access control unlocking system, mobile phone palm print recognition, and automatic palm print recognition.

In the image processing method, on the one hand, living body detection is performed through a fusion image obtained by fusing the image frequency domain information with the texture information of the image. With reference to the two different image information, the detection is caused to be more accurate, a plurality of different scenarios may be adapted, and the acquisition of the to-be-detected image does not require a specific hardware device, and may have good performance in different lighting environments, thereby having higher universality; and on the other hand, to overcome a problem that a single model cannot adapt to different attack types due to different features of reproduced images of different attack types, two-level detection is adopted, that is, the global detection for the entire image and the local detection for the palm print region. In this way, different attack types may have better detection effect. In addition, directional optimization may further be performed on either of the detection processes without affecting the detection effect of the other detection process.

Figure 4:
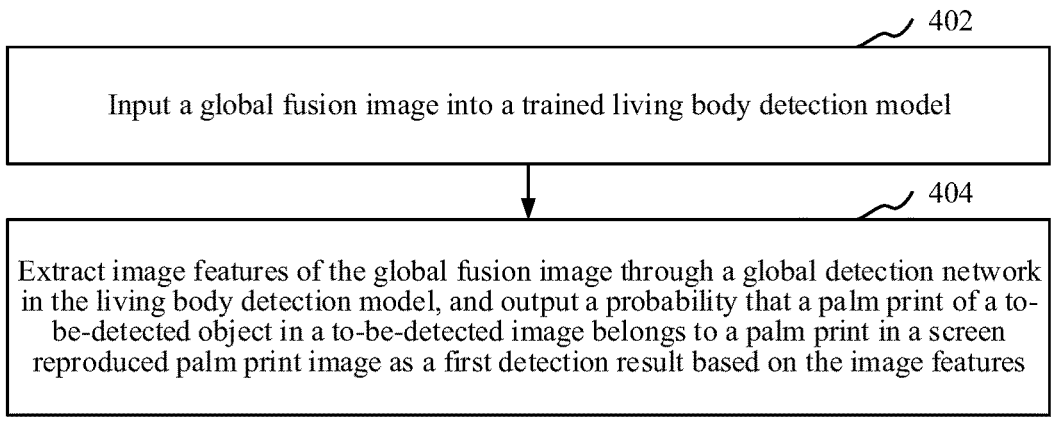
FIG. 4 is a schematic flowchart of obtaining a first detection result of a palm print in a to-be-detected image according to some embodiments.

In some embodiments, as shown in FIG. 4, the performing living body detection on a global frequency domain map corresponding to the to-be-detected image and a global fusion image obtained by fusing the to-be-detected image to obtain a first detection result of the palm print in the to-be-detected image includes:

Operation 402. Input the global fusion image into a trained living body detection model.

The living body detection model is a machine learning model that the computer device learns from a plurality of sample images in advance, so as to have the capability to perform palm print living body detection on the image. The computer device used for training may be a terminal or a server. The living body detection model may be implemented by using a neural network model, such as a convolutional neural network model.

The living body detection model includes a global detection network and a local detection network. A two-level network is used for performing determining by combining the global features of the to-be-detected image with the features of the palm print region. The two-level network respectively performs defending on the screen reproduced palm print image and the paper reproduced palm print image. A detection order of the two-level detection network may be arbitrary, which is not limited herein.

In some embodiments, the computer device may set the respective model structure of the two-level network in advance to obtain respective initial neural network model, and then train the initial neural network model through a sample image and a corresponding labeling category to obtain respective trained model parameters. In this way, when palm print living body detection needs to be performed on the to-be-detected image, the computer device may obtain the respective model parameters that are trained in advance, the model parameters are imported into a model structure of the respective neural network model that is set in advance, and a living body detection model is obtained according to the two-level detection network.

Operation 404. Extract image features of the global fusion image through a global detection network in the living body detection model, and output a probability that the palm print of the to-be-detected object in the to-be-detected image belongs to the palm print in the screen reproduced palm print image as the first detection result based on the image features.

In this embodiment, the living body detection model includes a global detection network and a local detection network. Both the global detection network and the local detection network may be network structures implemented based on a convolutional neural network. The global detection network and the local detection network are trained separately to be obtained due to different sizes of the processed image. The global detection network is used for performing palm print living body detection on the to-be-detected image to obtain the first detection result corresponding to the to-be-detected image. The local detection network is used for performing palm print living body detection on the palm print image cropped from the to-be-detected image to obtain a second detection result corresponding to the to-be-detected image.

Image features are characteristics or features that distinguish an image from other images, or a collection of these characteristics and features, and are an image description quantity used for describing an image. For an image, each image has its own features that may be distinguished from other types of images, such as brightness, edge, texture, color, or the like. Some are obtained through transformation or processing, such as a spectrum, a histogram, and a principal component. The global fusion image is a four-channel image obtained by fusing the to-be-detected image with the global frequency domain map corresponding to the to-be-detected image. The image features of the global fusion image are hidden in the four-channel matrix. The computer device may extract image features from the to-be-detected image through a global detection network. The extracted image features not only need to describe the original to-be-detected image well, but further need to be able to distinguish the to-be-detected image from other images. As far as the extracted image features are concerned, a difference between the living body palm print images is relatively small, while a difference between the living body palm print image and the reproduced palm print image is relatively large.

In some embodiments, network structures within the global detection network and the local detection network are not limited, and designers may perform setting according to actual needs, provided that the global detection network and the local detection network may implement palm print living body detection on the image. For example, both the global detection network and the local detection network may use Resnet 18 as a network backbone. The Resnet 18 has good classification performance, and in addition, the not too deep network layer of the Resnet 18 also ensures the timeliness of forward inference.

Figure 5:
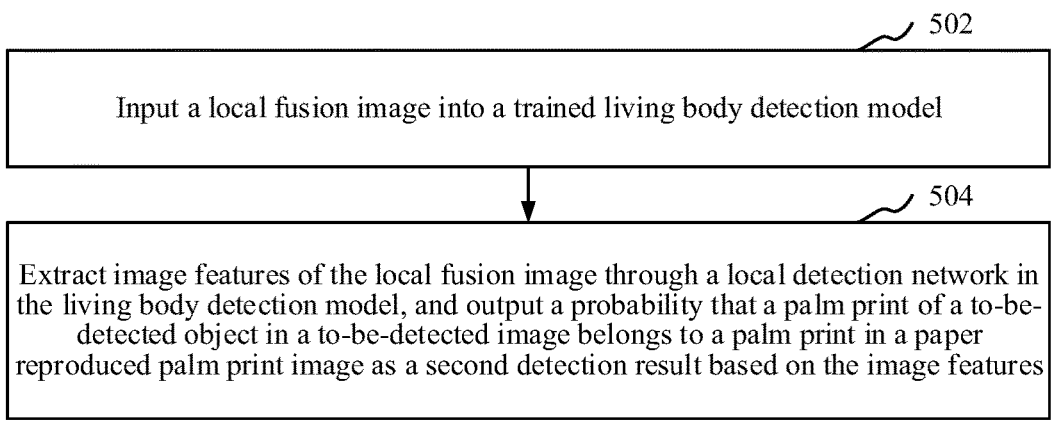
FIG. 5 is a schematic flowchart of obtaining a second detection result of a palm print in a to-be-detected image according to some embodiments.

In some embodiments, as shown in FIG. 5, the performing living body detection on a local fusion image obtained by fusing a local frequency domain map corresponding to the palm print image with the palm print image to obtain a second detection result of the palm print in the to-be-detected image includes:

Operation 502. Input the local fusion image into a trained living body detection model.

As mentioned above, the local fusion image is an image obtained by fusing the palm print image of the to-be-detected image and the local frequency domain map corresponding to the palm print image, and is an image that pays more attention to the local information of the palm print region in the to-be-detected image. The computer device may input the local fusion image into the trained living body detection model and the local detection network in the living body detection model, and perform living body detection on the local fusion image, so as to implement two-level detection on the to-be-detected image.

Operation 504. Extract image features of the local fusion image through a local detection network in the living body detection model, and output the probability that the palm print of the to-be-detected object in the to-be-detected image belongs to the palm print in the paper reproduced palm print image as the second detection result based on the image features.

In a specific embodiment, the computer device may respectively obtain the trained global detection network and the local detection network, and obtain the trained palm print living body detection after cascading after the model training is respectively performed on the first model and the second model through the sample image by setting the first model and the second model based on the neural network.

Figure 6:
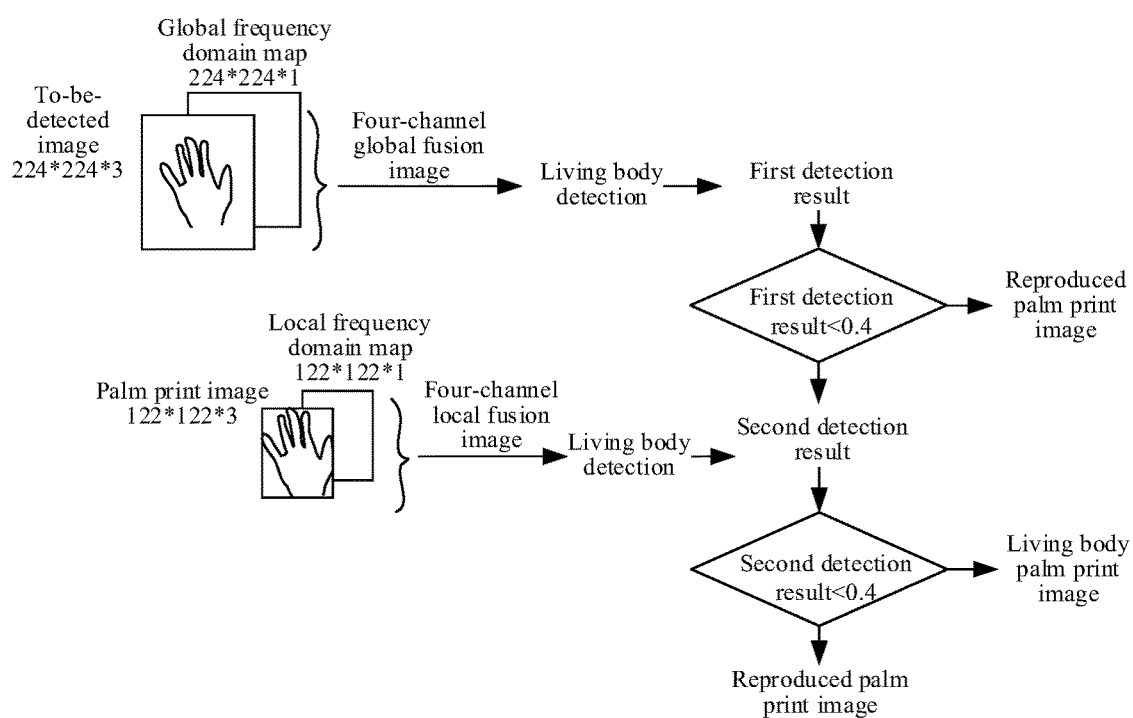
FIG. 6 is a schematic diagram of a framework of a process of performing palm print living body detection according to some embodiments.

FIG. 6 is a schematic diagram of a framework of an image processing method according to some embodiments. Referring to FIG. 6, the computer device obtains the to-be-detected image on which palm print living body detection is to be performed, adjusts the to-be-detected image to an RGB image with a size of 224*224*3, performs frequency domain transformation on the to-be-detected image to obtain a corresponding global frequency domain map, connects an RGB image of the to-be-detected image with the global frequency domain map to form a four-channel image with a size of 224*224*4, that is, a global fusion image, and inputs the global fusion image into the global detection network to obtain the first detection result of the to-be-detected image through the palm print living body detection. In addition, the computer device obtains the palm print region after performing palm print region cropping on the to-be-detected image, adjusts palm print region to a size of 122*122*3 to obtain the palm print image, performs frequency domain transformation on the palm print region to obtain the corresponding local frequency domain map, connects the palm print image with the local frequency domain map to form a four-channel image with a size of 122*122*4, that is, a local fusion image, and inputs the local fusion image into the local detection network to obtain the second detection result of the to-be-detected image through the palm print living body detection. Final determining logic of the to-be-detected image that passes the palm print living body detection is as follows: if the first detection result is less than 0.4, it is directly determined that the to-be-detected image is a reproduced palm print image, if the first detection result is greater than 0.4, it is checked whether the second detection result is less than 0.4, and if yes, it is directly determined that the to-be-detected image is a reproduced palm print image; and if the second detection result is also greater than 0.4, it is finally determined that the to-be-detected image is a living palm print image.

In some embodiments, before operation 202, the image processing method further includes a training operation of the model, which may include: obtaining a first sample set and a second sample set, where sample images in the first sample set and the second sample set include the palm print; performing model training on a first model based on a neural network by using a first sample image in the first sample set to obtain a global detection network; and obtaining a sample palm print image according to the palm print region of a second sample image in the second sample set, and performing model training on a second model based on the neural network by using the palm print image to obtain a local detection network.

The first model and the second model are pre-set model structures, and the model parameters are initial model parameters. The initial model parameters are updated through continuous training, so as to obtain the trained model parameters. By importing the trained model parameters into a model of the same framework, a global detection network and a local detection network with the capability of performing palm print living body detection are obtained, thereby obtaining a living body detection model. The global detection network and the local detection network may be deployed on the same computer device, or may also be separately deployed, so that parallel detection may be performed on the to-be-detected image and the detection efficiency may be improved.

In some embodiments, the labeling category of the first sample image in the first sample set is one of a living body palm print image and a screen reproduced palm print image. The labeling category of the second sample image in the second sample set is one of a living body palm print image and a paper reproduced palm print image.

In some embodiments, the computer device may first perform palm print detection on the second sample image to determine a palm print region in the second sample image; and crop the second sample image according to the palm print region to obtain the sample palm print image.

The computer device may obtain a first sample set and a second sample set, and adjust model parameters of the first model by using the first sample image in the first sample set. Each training sample in the first sample set includes a first sample image and a labeling category corresponding to the first sample image. During model training, each first sample image and the corresponding labeling category are sequentially used as an input, and the first sample image is inputted into the first model for performing processing. Model parameters are adjusted according to a processing result outputted by the current model and the loss constructed by the labeling category of the first sample image, then the next training sample is processed based on the adjusted model parameters, and the process is repeated until a trained global detection network is obtained.

Similarly, the model parameters of the second model are adjusted by using the second sample image in the second sample set. Each training sample in the second sample set includes a second sample image and a labeling category corresponding to the second sample image. During model training, each second sample image and the corresponding labeling category are sequentially used as an input. The sample palm print image is obtained according to the second sample image, and the sample palm print image is inputted into the second model for performing processing. The model parameters are adjusted according to a processing result outputted by the current model and the loss constructed by the labeling category of the second sample image, then the next training sample is processed based on the adjusted model parameters, and the process is repeated until a trained local detection network is obtained.

Figure 7:
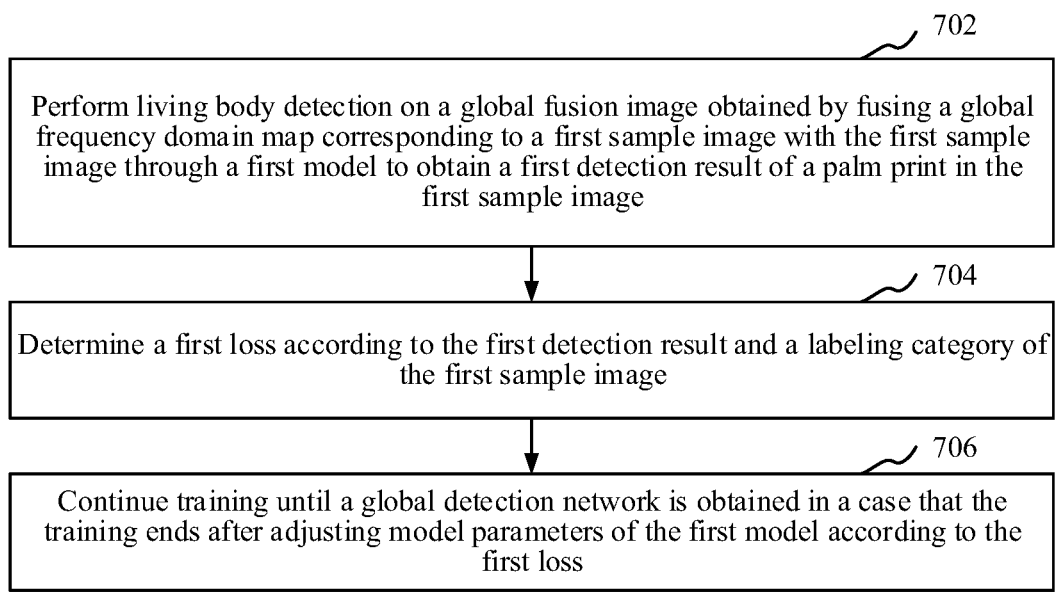
FIG. 7 is a schematic flowchart of training operations of a global detection network according to some embodiments.

In some embodiments, as shown in FIG. 7, training operations of the global detection network include operation 702 to operation 706:

Operation 702. Perform living body detection on a global fusion image obtained by fusing a global frequency domain map corresponding to the first sample image with the first sample image through the first model to obtain a first detection result of the palm print in the first sample image.

In some embodiments, the computer device may perform frequency domain transformation processing on the first sample image to obtain the global frequency domain map corresponding to the first sample image; and fuse the first sample image with a global frequency domain map to obtain a global fusion image. The computer device performs living body detection on the global fusion image through the first model to obtain a first detection result of the palm print in the first sample image.

In some embodiments, the computer device may extract image features of the global fusion image through the first model, and output the probability that the palm print in the first sample image belongs to the palm print in the screen reproduced palm print image based on the image features as the first detection result.

In some embodiments, the computer device may adjust the first sample image to the first preset size, then perform frequency domain transformation processing on the adjusted image to obtain a global frequency domain map, and fuse the adjusted image with the global frequency domain map to obtain a global fusion image.

Operation 704. Determine a first loss according to the first detection result and a labeling category of the first sample image.

The labeling category of the first sample image is one of the living body palm print and the non-living body palm print, which may be represented by 0 or 1. For example, when the palm print in the first sample image belongs to the palm print in the screen reproduced palm print image, the corresponding labeling category may be represented by 1. When the palm print in the first sample image belongs to a living body palm print, the corresponding labeling category may be represented by 0. The first detection result may be the probability that the palm print in the first sample image belongs to the palm print in the screen reproduced palm print image. The terminal may obtain the labeling category of the first sample image and the first detection result obtained by performing living body detection through the first model, and determine a first loss based on the difference between the two. The first loss may be a cross-entropy loss.

Operation 706. Continue training until the global detection network is obtained in a case that the training ends after adjusting model parameters of the first model according to the first loss.

The first loss is used for adjusting the first model in a direction of reducing the difference between the labeling category of the first sample image and the first detection result. In this way, it is ensured that the global detection network obtained by training has the accuracy of palm print living body detection on the to-be-detected image.

After the terminal obtains the first loss, when the model parameters are adjusted, a stochastic gradient descent algorithm may be used for adjusting the model parameters in the direction of reducing the difference between the labeling category corresponding to the first sample image and the first detection result. In this way, after many adjustments, a global detection network that may accurately perform living body detection may be obtained.

Figure 8:
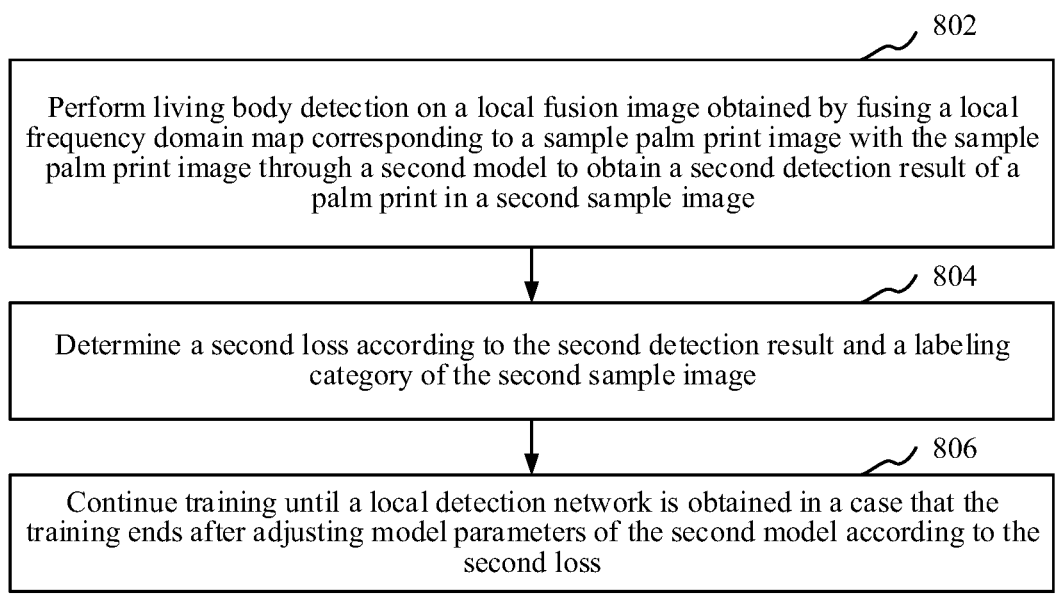
FIG. 8 is a schematic flowchart of training operations of a local detection network according to some embodiments.

In some embodiments, as shown in FIG. 8, training operations of the local detection network include operation 802 to operation 806:

Operation 802. Perform living body detection on a local fusion image obtained by fusing a local frequency domain map corresponding to the sample palm print image with the sample palm print image through a second model to obtain a second detection result of the palm print in the second sample image; and In some embodiments, the computer device may perform frequency domain transformation processing on the sample palm print image to obtain the corresponding local frequency domain map; and fuse the sample palm print image with a local frequency domain map to obtain a local fusion image. The computer device performs living body detection on the local fusion image through the second model to obtain a second detection result of the palm print in the second sample image.

In some embodiments, the computer device may extract image features of the local fusion image through the second model, and output the probability that the palm print in the second sample image belongs to the palm print in the paper reproduced palm print image based on the image features as the second detection result.

In some embodiments, the computer device may adjust the sample palm print image to the second preset size, then perform frequency domain transformation processing on the adjusted image to obtain a global frequency domain map, and fuse the adjusted image with the global frequency domain map to obtain a global fusion image.

Operation 804. Determine a second loss according to the second detection result and a labeling category of the second sample image.

The labeling category of the second sample image is one of the living body palm print and the non-living body palm print, which may be represented by 0 or 1. For example, when the palm print in the second sample image belongs to the palm print in the paper reproduced palm print image, the corresponding labeling category may be represented by 1. When the palm print in the second sample image belongs to a living body palm print, the corresponding labeling category may be represented by 0. The second detection result may be the probability that the palm print in the second sample image belongs to the palm print in the paper reproduced palm print image. The terminal may obtain the labeling category of the second sample image and the second detection result obtained by performing living body detection through the second model, and determine a second loss based on the difference between the two. The second loss may be a cross-entropy loss.

Operation 806. Continue training until the local detection network is obtained in a case that the training ends after adjusting model parameters of the second model according to the second loss.

The second loss is used for adjusting the second model in a direction of reducing the difference between the labeling category of the second sample image and the second detection result. In this way, it is ensured that the local detection network obtained by training has the accuracy of palm print living body detection on the to-be-detected image.

After the terminal obtains the second loss, when the model parameters are adjusted, a stochastic gradient descent algorithm may be used for adjusting the model parameters in the direction of reducing the difference between the labeling category corresponding to the second sample image and the second detection result. In this way, after many adjustments, a local detection network that may accurately perform living body detection may be obtained.

Figure 9:
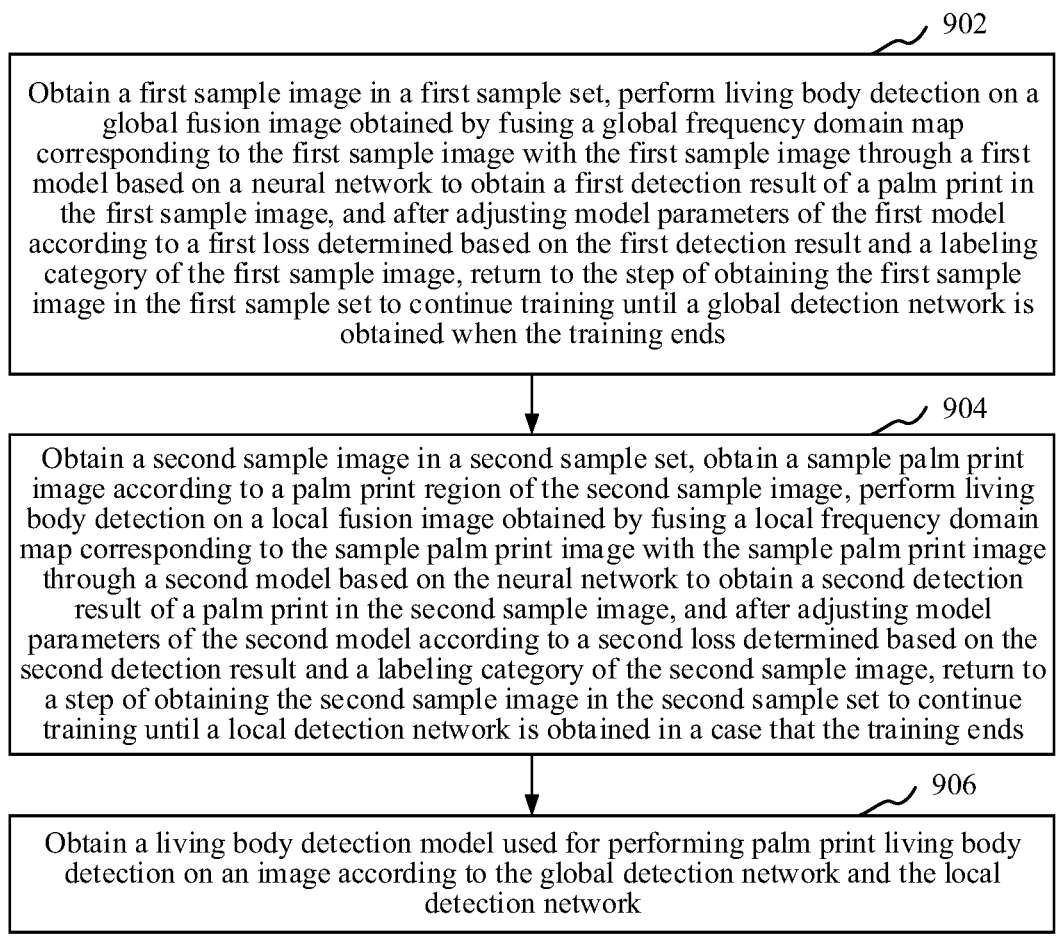
FIG. 9 is a schematic flowchart of a method for processing a living body detection model according to some embodiments.

In some embodiments, as shown in FIG. 9, a method for processing a living body detection model is provided, and a description is made by using an example in which the method is applied to a computer device, including the following operations:

Operation 902. Obtain a first sample image in a first sample set, perform living body detection on a global fusion image obtained by fusing the global frequency domain map corresponding to the first sample image with the first sample image through a first model based on a neural network to obtain a first detection result of the palm print in the first sample image, and after adjusting model parameters of the first model according to a first loss determined based on the first detection result and a labeling category of the first sample image, return to the operation of obtaining the first sample image in the first sample set to continue training until a global detection network is obtained when the training ends.

Operation 904. Obtain a second sample image in a second sample set, obtain a sample palm print image according to a palm print region of the second sample image, perform living body detection on a local fusion image obtained by fusing a local frequency domain map corresponding to the sample palm print image with the sample palm print image through a second model based on the neural network to obtain a second detection result of the palm print in the second sample image, and after adjusting model parameters of the second model according to a second loss determined based on the second detection result and a labeling category of the second sample image, return to a operation of obtaining the second sample image in the second sample set to continue training until a local detection network is obtained in a case that the training ends.

Operation 906. Obtain a living body detection model used for performing palm print living body detection on an image according to the global detection network and the local detection network.

For specific embodiments of the foregoing operations, reference may be made to the descriptions in the foregoing embodiments on model training.

In the method for processing the living body detection model, the global detection network and the local detection network in the living body detection model based on the neural network are obtained through independent training. The global detection network may perform palm print living body detection on the fusion image obtained by fusing the image frequency domain information with the texture information of the image. With reference to the two different image global information, the detection is caused to be more accurate, and a plurality of different scenarios may be adapted, such as the detection of the screen reproduced palm print image; and the local detection network may perform the palm print living body detection on the fusion image obtained by fusing the frequency domain information of the palm print region of the image with the texture information of the palm print region of the image. Because more attention is paid to the local information of the image, the detection accuracy may be further improved.

Figure 10:
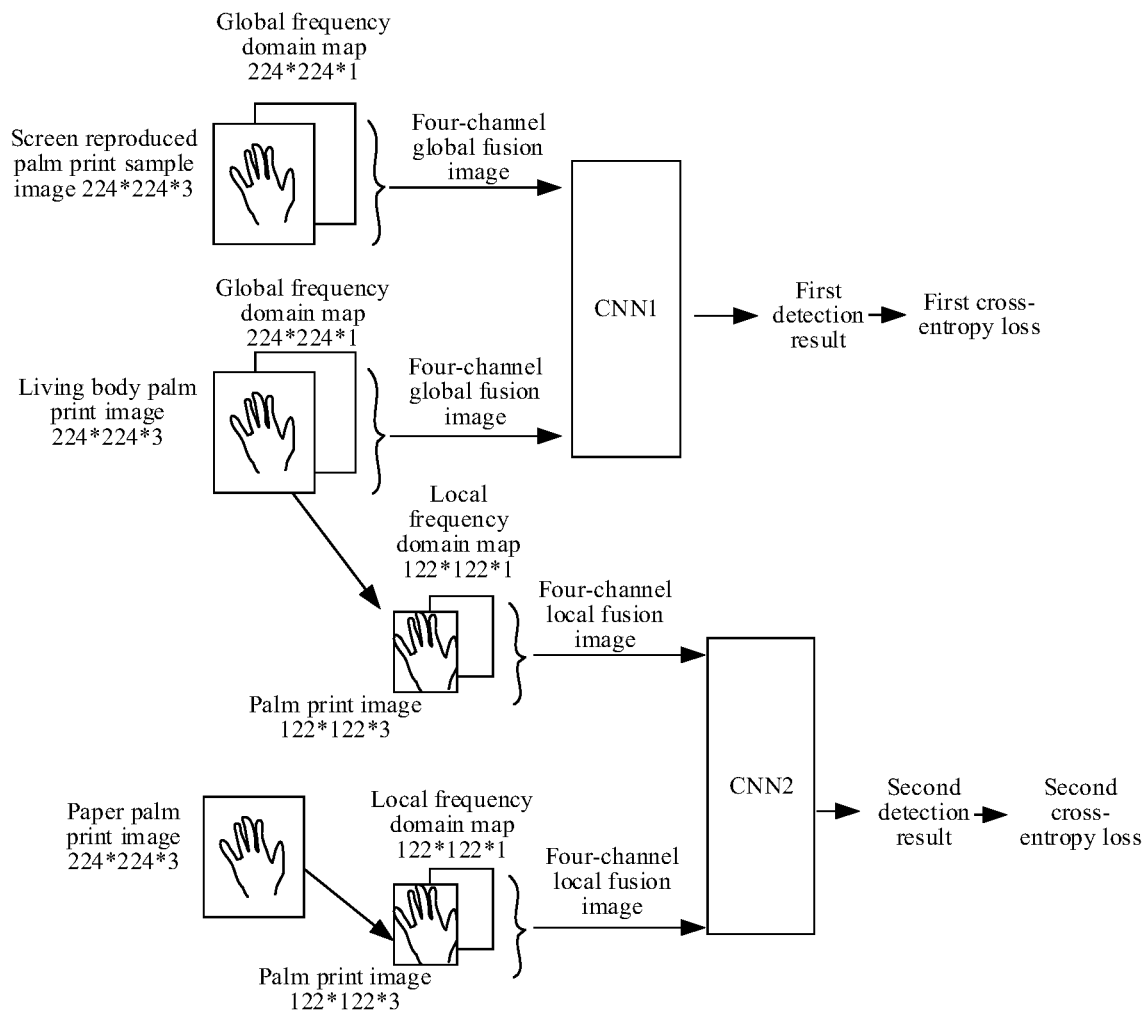
FIG. 10 is a schematic diagram of a framework of a training process of a living body detection model according to some embodiments.

FIG. 10 is a schematic diagram of a framework of a process of training a living body detection model according to a specific embodiment. Referring to FIG. 10, the computer device sets CNN1 and CNN2. In a stage of model training, for the CNN1, an input size is 224*224*4, and a specific implementation is as follows: first, a size of a sample image (including living body palm print image and high-definition screen reproduced image) is adjusted to 224*224*3, then fast Fourier transform is used for respectively calculating the corresponding frequency domain map, and a size is 224*224*1, and the RGB image and the frequency domain map are jointly connected to form a four-channel image with a size of 224*224*4. Because a main task of the CNN1 is to perform classification on the living body palm print image and the high-definition screen reproduced palm print image, to cause the CNN1 to discriminate the two images well, a cross-entropy loss function on which a binary classification is performed is used for constraining an output value of the CNN1: if an input sample is a living body palm print image, then an output of the CNN1 may be a probability value close to 1; and if an input sample is a high-definition screen reproduced image, an output of the CNN1 may be a probability value close to 0. In a training process, the living body palm print image and the high-definition screen reproduced image are continuously added to the CNN1, and the cross-entropy loss is continuously reduced through an optimizer. When the cross-entropy loss is reduced to a specific level and no longer has large fluctuations, the training of the CNN1 is considered to have converged.

Similarly, for the CNN2, a difference between the CNN2 and the CNN1 in the training process is in input data. In a model training stage, for the CNN_2, an input size is 122*122*4, and a specific implementation is as follows: first, palm print detection is performed on the sample image (including living body palm print image and paper reproduced palm print image) by using a palm print detection tool. Then, according to the detection result, the palm print region is cropped on the RGB original image of the sample image, the cropped palm print region is adjusted to a size of 122*122*3, and the corresponding frequency domain map is respectively calculated by using the fast Fourier transform, and a size is 122*122*1. Finally, the RGB image is connected with the frequency domain map to form a four-channel image with a size of 122*122*4. Because the CNN2 mainly performs a binary classification on the living body palm print image and the paper reproduced palm print image, after training, the CNN2 outputs a probability value close to 0 for the paper reproduced palm print image. In a training process, the living body palm print image and the paper reproduced palm print image are continuously added to the CNN2, and the cross-entropy loss is continuously reduced through an optimizer. When the cross-entropy loss is reduced to a specific level and no longer has large fluctuations, the training of the CNN2 is considered to have converged.

In a model testing stage, processing needs to be performed on a testing image in two sizes (224*224*4 and 122*122*4), and then obtained results are respectively inputted into the CNN1 and the CNN2 for calculating scores. Assuming that a to-be-detected image is transmitted, a type is unknown, and the four-channel large image data (that is, a size is 224*224*4) is obtained in the same manner as training. In addition, palm print detection and cropping are performed on the RGB three-channel to-be-detected image, the palm print image obtained by cropping is adjusted to a size of 122*122*3, and the corresponding frequency domain map is calculated to obtain four-channel small image data (that is, the size is 122*122*4). The large image data is transmitted to the CNN1, and the small image data is transmitted to the CNN2. Corresponding probability values are respectively calculated, which are recorded as a score 1 and a score 2, and both of which are decimals between 0 and 1. The determining logic of the living body palm print image and the reproduced palm print image is as follows: if the score 1<0.4, a type is directly determined as the reproduced palm print image and exits, otherwise, a value of the score 2 is checked; if the score 2<0.4, a type is determined to be the reproduced palm print image; and if the score 2>=0.4, a type is determined as the living body palm print image.

In the foregoing embodiment, the palm print living body is determined by using the image fused with the frequency domain and RGB information, and the problem of the palm print living body is resolved with reference to two different information sources, which is more robust than the general use of single-source image information for performing detection. In addition, for different attack types, a two-level detection network is set. Directional optimization may be performed at a corresponding level without affecting the detection effect of another level, avoiding the difficulty of optimization by using a single model, the consumed time is relatively short, and the user experience is improved.

In a specific embodiment, the image processing method includes the following operations:

1. A first sample set and a second sample set are obtained, where sample images in the first sample set and the second sample set include palm prints, the labeling category of the first sample image in the first sample set is one of a living body palm print image and a screen reproduced palm print image, and the labeling category of the second sample image in the second sample set is one of a living body palm print image and a paper reproduced palm print image;
2. Living body detection is performed on a global frequency domain map corresponding to the first sample image and a global fusion image obtained by fusing the first sample image through the first model to obtain a first detection result of the palm print in the first sample image;
3. A first loss is determined according to the first detection result and a labeling category of the first sample image;
4. Training is continued until the global detection network is obtained in a case that the training ends after adjusting model parameters of the first model according to the first loss;
5. Living body detection is performed on a local fusion image obtained by fusing a local frequency domain map corresponding to the sample palm print image with the sample palm print image through the second model to obtain a second detection result of the palm print in the sample image;
6. A second loss is determined according to the second detection result and a labeling category of the second sample image;
7. Training is continued until the local detection network is obtained in a case that the training ends after adjusting model parameters of the second model according to the second loss;
8. A to-be-detected image is obtained, the to-be-detected image including the palm print of a to-be-detected object;
9. Frequency domain transformation processing is performed on the to-be-detected image to obtain the global frequency domain map; and
a global frequency domain map is fused with the to-be-detected image to obtain a global fusion image;
10. Image features of the global fusion image are extracted through a global detection network, and probability that the palm print of the to-be-detected object in the to-be-detected image belongs to the palm print in the screen reproduced palm print image is outputted as the first detection result based on the image features;
11. Palm print detection is performed on the to-be-detected image to determine a palm print region in the to-be-detected image;
12. The to-be-detected image is cropped according to the palm print region to obtain the palm print image;
13. Frequency domain transformation processing is performed on the palm print image to obtain the local frequency domain map;
14. A local frequency domain map is fused with the palm print image to obtain a local fusion image;
15. Image features of the local fusion image are extracted through a local detection network in the living body detection model, and probability that the palm print of the to-be-detected object in the to-be-detected image belongs to the palm print in the paper reproduced palm print image is outputted as the second detection result based on the image features;
16. In a case that the first detection result indicates a first probability that the palm print of the to-be-detected object belongs to the palm print in the screen reproduced palm print image, and the first probability is less than a first threshold, the second detection result is obtained, where the second detection result indicates a second probability that the palm print of the to-be-detected object belongs to the palm print in a paper reproduced palm print image; and it is determined that the palm print of the to-be-detected object is the living body palm print in a case that the second probability is less than a second threshold; and
17. Palm print recognition is performed on the palm print in the to-be-detected image to obtain a palm print recognition result in a case that the living body detection result indicates that the palm print in the to-be-detected image is a living body palm print; and identity authentication is performed on the to-be-detected object according to the palm print recognition result.

It is to be understood that although the operations in the flowchart are sequentially shown according to indication of an arrow, the operations are not necessarily sequentially performed according to a sequence indicated by the arrow. Unless clearly specified in this specification, there is no strict sequence limitation on the execution of the operations, and the operations may be performed in another sequence. Moreover, at least some of the operations in the flowchart may include a plurality of operations or a plurality of stages. The operations or stages are not necessarily performed at the same moment but may be performed at different moments. The operations or stages are not necessarily performed sequentially, but may be performed in turn or alternately with another operation or at least some of operations or stages of the another operation.

Figure 11:
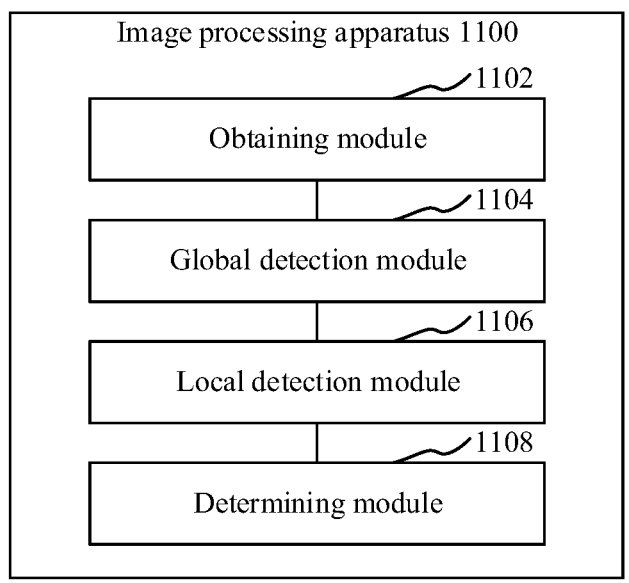
FIG. 11 is a structural block diagram of an image processing apparatus according to some embodiments.

In some embodiments, as shown in FIG. 11, an image processing apparatus 1100 is provided. The apparatus may use a software module or a hardware module, or a combination of the two to become a part of a computer device. The apparatus may include: an obtaining module 1102, a global detection module 1104, a local detection module 1106, and a determining module 1108, where
the obtaining module 1102 is configured to obtain a to-be-detected image, the to-be-detected image including biological features of a to-be-detected object;
the global detection module 1104 is configured to perform living body detection on a global frequency domain map corresponding to the to-be-detected image and a global fusion image obtained by fusing the to-be-detected image to obtain a first detection result corresponding to the to-be-detected image; directly determine that the to-be-detected image does not pass the living body detection in a case that the first detection result indicates that the to-be-detected image belongs to a screen reproduced image; and a local detection module 1106 is configured to obtain, in a case that the first detection result indicates that the to-be-detected image does not belong to the screen reproduced image, a biological feature image based on the biological features in the to-be-detected image, perform living body detection on a local fusion image obtained by fusing the local frequency domain map corresponding to the biological feature image with frequency domain map the biological feature image to obtain a second detection result corresponding to the to-be-detected image; and a determining module 1108 is configured to determine a living body detection result corresponding to the to-be-detected image according to the first detection result and the second detection result.

In some embodiments, using a biological feature as a palm print as an example, the apparatus may include:

an obtaining module 1102, configured to obtain a to-be-detected image, the to-be-detected image including the palm print of a to-be-detected object;

the global detection module 1104, configured to perform living body detection on a global fusion image obtained by fusing a global frequency domain map corresponding to the to-be-detected image with the to-be-detected image to obtain a first detection result of the palm print in the to-be-detected image, and directly determine that the to-be-detected image does not pass the living body detection when the first detection result indicates that the to-be-detected image belongs to the screen reproduced image;

a local detection module 1106 is configured to obtain, in a case that the first detection result indicates that the to-be-detected image does not belong to the screen reproduced image, a palm print image based on the print image in the to-be-detected image, fuse a local frequency domain map corresponding to the print image with the print image to obtain a local fusion image, and perform living body detection to obtain a second detection result corresponding to the to-be-detected image; and a determining module 1108, configured to determine a living body detection result of the palm print of the to-be-detected object according to the first detection result and the second detection result.

In some embodiments, the image processing apparatus 1100 further includes a fusion module, configured to perform frequency domain transformation processing on the to-be-detected image to obtain the global frequency domain map; and fuse a global frequency domain map with the to-be-detected image to obtain a global fusion image.

In some embodiments, the global detection module 1104 is further configured to input the global fusion image into the trained living body detection model; and extract image features of the global fusion image through a global detection network in the living body detection model, and output a probability that the palm print of the to-be-detected object in the to-be-detected image belongs to the palm print in the screen reproduced palm print image as the first detection result based on the image features.

In some embodiments, the local detection module 1106 is further configured to perform palm print detection on the to-be-detected image to determine a palm print region in the to-be-detected image; and crop the to-be-detected image according to the palm print region to obtain the palm print image.

In some embodiments, the image processing apparatus further includes a fusion module, configured to perform frequency domain transformation processing on the palm print image to obtain the local frequency domain map; and fuse a local frequency domain map with the palm print image to obtain a local fusion image.

In some embodiments, the local detection module 1106 is further configured to input the global fusion image into the trained living body detection model; and extract image features of the local fusion image through a local detection network in the living body detection model, and output a probability that the palm print of the to-be-detected object in the to-be-detected image belongs to the palm print in the paper reproduced palm print image as the second detection result based on the image features.

In some embodiments, the determining module 1108 is further configured to obtain, in a case that the first detection result indicates a first probability that the palm print of the to-be-detected object belongs to the palm print in the screen reproduced palm print image, and the first probability is less than a first threshold, the second detection result, where the second detection result indicates a second probability that the palm print of the to-be-detected object belongs to the palm print in a paper reproduced palm print image; and determine that the palm print of the to-be-detected object is the living body palm print in a case that the second probability is less than a second threshold.

In some embodiments, the determining module 1108 is further configured to determine that the palm print of the to-be-detected object is the palm print in the screen reproduced palm print image in a case that the first probability is greater than the first threshold; and determine that the palm print of the to-be-detected object is the palm print in the paper reproduced palm print image in a case that the second probability is greater than the second threshold.

In some embodiments, the image processing apparatus further includes an image obtaining module, configured to obtain the original acquired image; adjust the acquired image to a first preset size to obtain the to-be-detected image; perform palm print detection on the acquired image to determine the palm print region in the acquired image; and after cropping the palm print region from the acquired image, adjust the palm print region to a second preset size to obtain the palm print image.

In some embodiments, the image processing apparatus further includes a training module, and the training module includes a sample image obtaining unit, a global detection network training unit, and a local detection network training unit;

the sample image obtaining unit is configured to obtain a first sample set and a second sample set, where sample images in the first sample set and the second sample set include the palm print;

the global detection network training unit is configured to perform model training on a first model by using a first sample image in the first sample set based on a neural network to obtain a global detection network; and the local detection network training unit is configured to obtain a sample palm print image according to a palm print region of a second sample image in the second sample set, and perform model training on a second model based on the neural network by using the sample palm print image to obtain a local detection network.

In some embodiments, the global detection network training unit is further configured to perform living body detection on a global fusion image obtained by fusing a global frequency domain map corresponding to the first sample image with the first sample image through the first model to obtain a first detection result of the palm print in the first sample image; determine a first loss according to the first detection result and a labeling category of the first sample image; and continue training until the global detection network is obtained in a case that the training ends after adjusting model parameters of the first model according to the first loss.

In some embodiments, the local detection network training unit is further configured to perform living body detection on a local fusion image obtained by fusing a local frequency domain map corresponding to the sample palm print image with the sample palm print image through the second model to obtain a second detection result of the palm print in the sample image; determine a second loss according to the second detection result and a labeling category of the second sample image; and continue training until the local detection network is obtained in a case that the training ends after adjusting model parameters of the second model according to the second loss.

In some embodiments, the image processing apparatus further includes a palm print recognition module, configured to perform palm print recognition on the palm print in the to-be-detected image to obtain a palm print recognition result in a case that the living body detection result indicates that the palm print in the to-be-detected image is a living body palm print; and perform identity authentication on the to-be-detected object according to the palm print recognition result.

Figure 12:
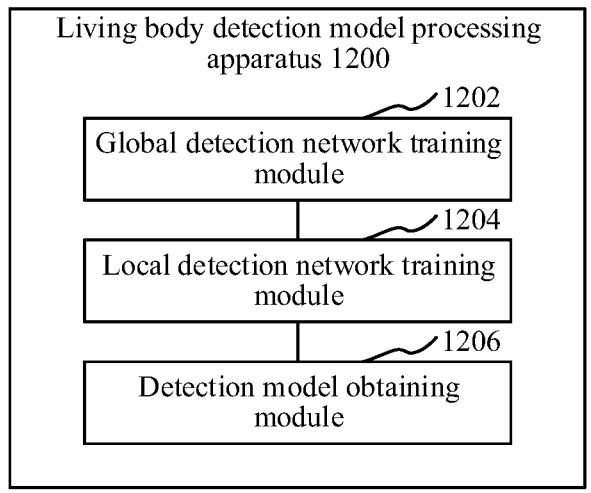
FIG. 12 is a structural block diagram of an apparatus for processing a living body detection model according to some embodiments.

In some embodiments, as shown in FIG. 12, an apparatus for processing a living body detection model 1200 is provided. The apparatus may use a software module or a hardware module, or a combination of the two to become a part of a computer device. The apparatus may include: a global detection network training module 1202, a local detection network training module 1204, and a detection model obtaining module 1206, where the global detection network training module 1202 is configured to obtain a first sample image in a first sample set, perform living body detection on a global fusion image obtained by fusing the global frequency domain map corresponding to the first sample image with the first sample image through a first model based on a neural network to obtain a first detection result corresponding to the first sample image, and after adjusting model parameters of the first model according to a first loss determined based on the first detection result and a labeling category of the first sample image, return to the operation of obtaining the first sample image in the first sample set to continue training until a global detection network is obtained when the training ends;

the local detection network obtaining module 1204 is configured to obtain a second sample image in a second sample set, obtain a sample biological feature image according to biological features of the second sample image, perform living body detection on a local fusion image obtained by fusing a local frequency domain map corresponding to the sample biological feature image with the sample biological feature image through a second model based on the neural network to obtain a second detection result corresponding to the second sample image, and after adjusting model parameters of the second model according to a second loss determined based on the second detection result and a labeling category of the second sample image, return to a operation of obtaining the second sample image in the second sample set to continue training until a local detection network is obtained in a case that the training ends; and the detection model obtaining module 1206 is configured to obtain a living body detection model used for performing living body detection on an image according to the global detection network and the local detection network.

In some embodiments, using a biological feature as a palm print as an example, the apparatus may include:

a global detection network training module 1202, configured to obtain a first sample image in a first sample set, perform living body detection on a global fusion image obtained by fusing the global frequency domain map corresponding to the first sample image with the first sample image through a first model based on a neural network to obtain a first detection result of the palm print in the first sample image, and after adjusting model parameters of the first model according to a first loss determined based on the first detection result and a labeling category of the first sample image, return to the operation of obtaining the first sample image in the first sample set to continue training until a global detection network is obtained when the training ends;

a local detection network training module 1204, configured to obtain a second sample image in a second sample set, obtain a sample palm print image according to a palm print region of the second sample image, perform living body detection on a local fusion image obtained by fusing a local frequency domain map corresponding to the sample palm print image with the sample palm print image through a second model based on the neural network to obtain a second detection result of the palm print in the second sample image, and after adjusting model parameters of the second model according to a second loss determined based on the second detection result and a labeling category of the second sample image, return to a operation of obtaining the second sample image in the second sample set to continue training until a local detection network is obtained in a case that the training ends; and the detection model obtaining module 1206, configured to obtain a living body detection model used for performing palm print living body detection on an image according to the global detection network and the local detection network.

For a specific limit of the image processing apparatus 1100 and the apparatus for processing the living body detection model 1200, reference may be made to the limit of the image processing method and the method for processing the living body detection model, which is not repeated herein.

The modules in the foregoing image processing apparatus and the apparatus for processing the living body detection model may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a terminal or a server, and an internal structure diagram thereof may be shown in FIG. 13. When the computer device is a terminal, the computer device may further include an image acquisition apparatus, such as a camera. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instruction in the non-volatile storage medium. The network interface of the computer device is configured to communicate with another external computer device through a network connection. The computer-readable instructions, when executed by a processor, implement an image processing method and/or a method for processing a living body detection model.

Figure 13:
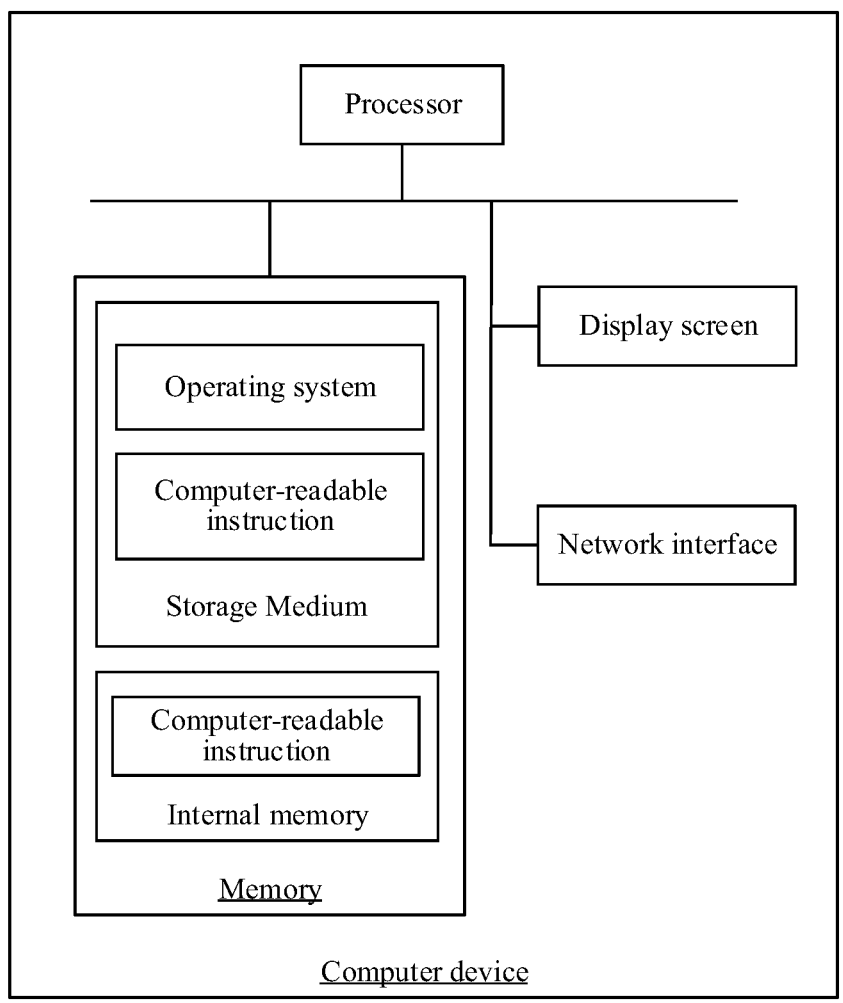
FIG. 13 is an internal structure diagram of a computer device according to some embodiments.

A person skilled in the art may understand that the structure shown in FIG. 13 is only a block diagram of a partial structure related to some embodiments, and does not limit the computer device to which the solution of the disclosure is applied. The computer device may include more or fewer components than those shown in the figure, or some components may be combined, or a different component deployment is used.

In some embodiments, a computer device is further provided, including a memory and a processor, the memory storing computer-readable instructions, the computer-readable instructions, when executed by the processor, causing the processor to implement the operations of the foregoing method embodiments.

In some embodiments, a non-transitory computer-readable storage medium may be provided, storing computer-readable instructions, the computer-readable instructions, when executed by a processor, implement the operations in the method embodiments.

In some embodiments, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the operations of the foregoing method embodiments.

A person of ordinary skill in the art may understand that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a storage, a database, or another medium used in some embodiments may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache memory. As a description and not a limit, the RAM may be in a plurality of forms, such as a static random access memory (SRAM) or a dynamic random access memory (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An image processing method, performed by a computer device, the image processing method comprising:
    obtaining an original image, the original image comprising biological features of a to-be-detected object;
    fusing a global frequency domain map corresponding to the original image with the original image to obtain a global fusion image;
    performing living body detection on the global fusion image to obtain a first detection result corresponding to the original image;
    directly determining that the original image does not pass the living body detection when the first detection result indicates that the original image belongs to a screen reproduced image; and
    when the first detection result indicates that the original image does not belong to the screen reproduced image, obtaining a biological feature image based on the biological features in the original image, fusing a local frequency domain map corresponding to the biological feature image with the biological feature image to obtain a local fusion image, performing living body detection on the local fusion image to obtain a second detection result corresponding to the original image, and determining a living body detection result corresponding to the original image according to the first detection result and the second detection result.

2. The image processing method according to claim 1, further comprising:
    performing frequency domain transformation processing on the original image to obtain the global frequency domain map.

3. The image processing method according to claim 1, wherein the performing living body detection comprises:
    inputting the global fusion image into a trained living body detection model; and
    extracting image features of the global fusion image through a global detection network in the trained living body detection model, and outputting a probability that the original image belongs to the screen reproduced image as the first detection result based on the image features.

4. The image processing method according to claim 1, wherein the obtaining the biological feature image comprises:
    performing biological feature detection on the original image to determine a biological feature region in the original image; and
    cropping the original image according to the biological feature region to obtain the biological feature image.

5. The image processing method according to claim 1, further comprising:
  performing frequency domain transformation processing on the biological feature image to obtain the local frequency domain map.

6. The image processing method according to claim 1, wherein the performing living body detection on the local fusion image comprises:
  inputting the local fusion image into a trained living body detection model; and
  extracting image features of the local fusion image through a local detection network in the trained living body detection model, and outputting a probability that the original image belongs to a paper reproduced image as the second detection result based on the image features.

7. The image processing method according to claim 1, wherein the determining a living body detection result corresponding to the to-be-detected image according to the first detection result and the second detection result comprises:
  when the first detection result indicates a first probability that the biological features of the to-be-detected object belong to biological features in the screen reproduced image, and the first probability is less than a first threshold,
  obtaining the second detection result, wherein the second detection result indicates a second probability that the biological features of the to-be-detected object belong to biological features in a paper reproduced image; and
  determining that the original image passes the living body detection when the second probability is less than a second threshold.

8. The image processing method according to claim 7, further comprising:
  determining that the biological features of the to-be-detected object are the biological features in the screen reproduced image when the first probability is greater than the first threshold; and
  determining that the biological features of the to-be-detected object are the biological features in the paper reproduced image when the second probability is greater than the second threshold.

9. The image processing method according to claim 1, further comprising:
  obtaining an acquired image;
  adjusting the acquired image to a first preset size to obtain the original image;
  performing biological feature detection on the acquired image to determine a biological feature region in the acquired image; and
  adjusting, after cropping the biological feature region from the acquired image, the biological feature region to a second preset size to obtain the biological feature image.

10. The image processing method according to claim 1, further comprising:
  obtaining a first sample set and a second sample set, wherein sample images in the first sample set and the second sample set comprise biological features;
  performing model training on a first model based on a neural network by using a first sample image in the first sample set to obtain a global detection network; and
  obtaining a sample biological feature image according to biological features of a second sample image in the second sample set, and performing model training on a second model based on the neural network by using the sample biological feature image to obtain a local detection network.

11. The image processing method according to claim 10, wherein the performing model training on the first model comprises:
  fusing a global frequency domain map corresponding to the first sample image with the first sample image to obtain a global fusion image, and performing living body detection on the global fusion image through the first model to obtain a first detection result corresponding to the first sample image;
  determining a first loss according to the first detection result and a labeling category of the first sample image; and
  continuing training until the global detection network is obtained when the training ends after adjusting model parameters of the first model according to the first loss.

12. The image processing method according to claim 10, wherein the performing model training on the second model comprises:
  fusing a local frequency domain map corresponding to the sample biological feature image with the sample biological feature image to obtain a local fusion image;
  performing living body detection on the local fusion image through the second model to obtain a second detection result corresponding to the second sample image;
  determining a second loss according to the second detection result and a labeling category of the second sample image; and
  continuing training until the local detection network is obtained when the training ends after adjusting model parameters of the second model according to the second loss.

13. The image processing method according to claim 1, further comprising:
  performing recognition on the biological features in the original image to obtain a recognition result when the living body detection result indicates that the original image passes the living body detection; and
  performing identity authentication on the to-be-detected object according to the recognition result.

14. An image processing apparatus, comprising:
  at least one memory configured to store program code; and
  at least one processor configured to read the program code and operate as instructed by the program code, the program code comprising:
  obtaining code configured to cause at least one of the at least one processor to obtain an original image, the original image comprising biological features of a to-be-detected object;
  global detection code configured to cause at least one of the at least one processor to fuse a global frequency domain map corresponding to the original image with the original image to obtain a global fusion image, and perform living body detection on the global fusion image to obtain a first detection result corresponding to the original image; directly determine that the original image does not pass the living body detection when the first detection result indicates that the original image belongs to a screen reproduced image;
  local detection code configured to cause at least one of the at least one processor to obtain, when the first detection result indicates that the original image does not belong to the screen reproduced image, a biological feature image based on the biological features in the original image, fuse a local frequency domain map corresponding to the biological feature image with the biological feature image to obtain a local fusion image, perform living body detection on the local fusion image to obtain a second detection result corresponding to the original image; and determining code configured to cause at least one of the at least one processor to determine a living body detection result corresponding to the original image according to the first detection result and the second detection result.

15. The image processing apparatus according to claim 14, wherein the determining code is further configured to cause at least one of the at least one processor to:
obtain, when the first detection result indicates a first probability that the biological features of the to-be-detected object belong to biological features in the screen reproduced image, and the first probability is less than a first threshold, the second detection result, wherein the second detection result indicates a second probability that the biological features of the to-be-detected object belong to biological features in a paper reproduced image; and
determine that the original image passes the living body detection when the second probability is less than a second threshold.

16. The image processing apparatus according to claim 14, wherein the program code further comprises:
first fusion code configured to cause at least one of the at least one processor to perform frequency domain transformation processing on the original image to obtain the global frequency domain map; and fuse the global frequency domain map with the original image to obtain a global fusion image.

17. The image processing apparatus according to claim 14, wherein the global detection code is further configured to cause at least one of the at least one processor to:
input the global fusion image into a trained living body detection model; and
extract image features of the global fusion image through a global detection network in the trained living body detection model, and output a probability that the original image belongs to the screen reproduced image as the first detection result based on the image features.

18. The image processing apparatus according to claim 14, wherein the local detection code is further configured to cause at least one of the at least one processor to:
perform biological feature detection on the original image to determine a biological feature region in the original image; and
crop the original image according to the biological feature region to obtain the biological feature image.

19. The image processing apparatus according to claim 14, wherein in the program code further comprises:
second fusion code configured to cause at least one of the at least one processor to perform frequency domain transformation processing on the biological feature image to obtain the local frequency domain map.

20. A non-transitory computer-readable storage media storing computer code that, when executed by at least one processor, causes the at least one processor to at least:
obtain an original image, the original image comprising biological features of a to-be-detected object;
fuse a global frequency domain map corresponding to the original image with the original image to obtain a global fusion image;
perform living body detection on the global fusion image to obtain a first detection result corresponding to the original image;
directly determine that the original image does not pass the living body detection when the first detection result indicates that the original image belongs to a screen reproduced image; and
obtain, when the first detection result indicates that the original image does not belong to the screen reproduced image, a biological feature image based on the biological features in the original image, fuse a local frequency domain map corresponding to the biological feature image with the biological feature image to obtain a local fusion image, perform living body detection on the local fusion image to obtain a second detection result corresponding to the original image, and determine a living body detection result corresponding to the original image according to the first detection result and the second detection result.

* * * * *